United States Patent
Stenger et al.

(10) Patent No.: US 10,897,147 B2
(45) Date of Patent: Jan. 19, 2021

(54) POWER CHARGING MODULE AND TEMPERATURE-BASED METHODS OF USING SAME

(71) Applicant: Molex, LLC, Lisle, IL (US)

(72) Inventors: Joseph D. Stenger, Woodbury, MN (US); Gregory Bella, Bolingbrook, IL (US); Jeffrey Ciarlette, Joliet, IL (US)

(73) Assignee: Molex, LLC, Lisle, IL (US)

( * ) Notice: Subject to any disclaimer, the term of this patent is extended or adjusted under 35 U.S.C. 154(b) by 152 days.

(21) Appl. No.: 15/352,353

(22) Filed: Nov. 15, 2016

(65) Prior Publication Data

US 2017/0141608 A1 May 18, 2017

Related U.S. Application Data

(60) Provisional application No. 62/255,841, filed on Nov. 16, 2015.

(51) Int. Cl.
*H02J 7/00* (2006.01)
*H02J 7/14* (2006.01)
(Continued)

(52) U.S. Cl.
CPC ......... *H02J 7/0027* (2013.01); *H01M 10/443* (2013.01); *H02J 7/0026* (2013.01);
(Continued)

(58) Field of Classification Search
CPC .............................. H02J 7/0027; H02J 7/0026
(Continued)

(56) References Cited

U.S. PATENT DOCUMENTS 5,166,596 A * 11/1992 Goedken ............... H02J 7/0091
320/150
5,497,068 A * 3/1996 Shiojima ............... H02J 7/0091
320/150
(Continued)

FOREIGN PATENT DOCUMENTS

DE  10-2012-103213 A1  10/2013
EP  2682301 A1  1/2014
(Continued)

OTHER PUBLICATIONS

Office Action for Japanese application No. 2018-545114, dated Apr. 2, 2019, 11 pages (5 pages of English Translation and 6 pages of Official Copy).
(Continued)

*Primary Examiner* — John T Trischler

(57) ABSTRACT

A power charging module includes a controller, a charging port, and a temperature sensor. The charging port delivers power to an external device plugged into the charging port. The temperature sensor provides a sensed temperature to the controller. A standard maximum power output is delivered to the charging port if the sensed temperature is categorized in a nominal thermal condition range, a modified maximum power output is delivered to the charging port if the sensed temperature is categorized in an intermediate thermal condition range, and power output to the charging port is discontinued if the sensed temperature is categorized in a critical thermal condition range.

15 Claims, 3 Drawing Sheets

| Auto Charging Scenario (algorithm) | Port 1 | Port 2 | Port 3 | Thermal Condition |
|---|---|---|---|---|
| Standard | 15W | 15W | 15W | Nominal |
| Limit 1 | 15W | 12W | 12W | Medium |
| Limit 2 | 15W | 7.5W | 7.5W | High |
| Limit ... | | | | |
| Limit N | 0W | 0W | 0W | Over Limit |

(51) Int. Cl.
*H02J 7/16* (2006.01)
*H01M 10/44* (2006.01)

(52) U.S. Cl.
CPC .......... *H02J 7/0045* (2013.01); *H02J 7/0091* (2013.01); *H02J 7/007192* (2020.01); *H02J 7/1461* (2013.01); *H02J 7/16* (2013.01)

(58) Field of Classification Search
USPC ....................................................... 320/107
See application file for complete search history.

(56) References Cited

U.S. PATENT DOCUMENTS

| | | | | |
|---|---|---|---|---|
| 5,592,070 | A | 1/1997 | Mino | |
| 5,604,419 | A * | 2/1997 | Bisschop | H02J 7/0091 320/150 |
| 5,623,195 | A * | 4/1997 | Bullock | H02J 7/0091 320/153 |
| 5,818,204 | A * | 10/1998 | Banyas | H02J 7/0071 320/150 |
| 6,006,996 | A * | 12/1999 | Bhatnagar | G05D 23/1934 236/46 R |
| 6,336,593 | B1 * | 1/2002 | Bhatnagar | G05D 23/1917 236/78 R |
| 6,348,777 | B1 * | 2/2002 | Brown | H02J 7/0091 320/137 |
| 6,714,882 | B1 * | 3/2004 | Iwaizono | H02J 7/0029 320/150 |
| 6,861,824 | B1 | 3/2005 | Liu et al. | |
| 6,925,400 | B2 * | 8/2005 | Iwaizono | H02J 7/0029 320/150 |
| 7,291,813 | B1 * | 11/2007 | Huang | G05D 23/1917 219/481 |
| 7,411,373 | B2 * | 8/2008 | Tashiro | H02J 7/0009 320/150 |
| 7,502,700 | B2 * | 3/2009 | Iwaizono | H02J 7/0029 320/134 |
| 7,525,288 | B2 * | 4/2009 | Tashiro | H02J 7/0045 320/150 |
| 7,615,963 | B2 * | 11/2009 | Tashiro | H02J 7/0045 320/106 |
| 7,737,665 | B2 * | 6/2010 | Grewe | H02J 7/0029 320/150 |
| 7,797,089 | B2 * | 9/2010 | Kozarekar | B60K 6/445 701/22 |
| 7,807,289 | B2 * | 10/2010 | Seiler | H01M 2/1022 429/158 |
| 7,847,525 | B2 * | 12/2010 | Okamoto | H02H 7/1213 322/33 |
| 7,948,212 | B2 * | 5/2011 | Odaohhara | H02J 7/047 320/128 |
| 8,059,007 | B2 * | 11/2011 | Hermann | H01M 10/486 320/106 |
| 8,082,743 | B2 * | 12/2011 | Hermann | B60H 1/00278 62/129 |
| 8,092,081 | B2 * | 1/2012 | Hermann | G01K 3/005 320/150 |
| 8,093,867 | B2 * | 1/2012 | Sato | H01M 10/443 320/150 |
| 8,203,314 | B2 * | 6/2012 | Odaohhara | H02J 7/0091 320/128 |
| 8,305,044 | B2 * | 11/2012 | Kawamoto | H01M 10/425 320/152 |
| 8,350,533 | B2 * | 1/2013 | Tam | G06F 1/203 320/144 |
| 8,395,356 | B2 * | 3/2013 | Schaefer | H01M 10/0525 320/134 |
| 8,421,400 | B1 * | 4/2013 | Khanna | H02J 7/0026 320/101 |
| 8,484,496 | B2 * | 7/2013 | Anderson | H02J 7/0091 713/320 |
| 8,674,662 | B2 * | 3/2014 | Chueh | H02J 7/0071 320/150 |
| 8,860,376 | B2 * | 10/2014 | Kimura | H01M 10/443 320/150 |
| 8,878,497 | B2 * | 11/2014 | Ohkuma | H02J 7/047 307/117 |
| 8,884,589 | B2 * | 11/2014 | Knowlton | H02J 7/0091 320/137 |
| 9,083,199 | B2 * | 7/2015 | Do Valle | H02J 7/04 |
| 9,114,794 | B2 * | 8/2015 | King | B60H 1/00278 |
| 9,153,846 | B2 * | 10/2015 | Liang | H01M 10/443 |
| 9,166,257 | B2 * | 10/2015 | Brun-Buisson | H01M 10/30 |
| 9,211,801 | B2 * | 12/2015 | Akai | H01M 10/44 |
| 9,225,199 | B2 * | 12/2015 | Teggatz | H02J 3/383 |
| 9,252,607 | B2 * | 2/2016 | Okamoto | H02J 7/0029 |
| 9,269,994 | B2 * | 2/2016 | Patino | H01M 10/482 |
| 9,312,712 | B2 * | 4/2016 | Lee | H02J 7/0071 |
| 9,337,680 | B2 * | 5/2016 | Gibeau | B60L 11/1875 |
| 9,399,857 | B2 * | 7/2016 | Kawasaki | E02F 9/267 |
| 9,406,980 | B2 * | 8/2016 | Sengupta | H01M 10/443 |
| 9,444,113 | B2 * | 9/2016 | Matsusue | H01M 8/04507 |
| 9,515,355 | B2 * | 12/2016 | Ito | H01M 10/482 |
| 9,553,468 | B2 * | 1/2017 | Bhardwaj | H02J 7/0091 |
| 9,555,715 | B2 * | 1/2017 | Sugano | B60L 1/003 |
| 9,583,959 | B2 * | 2/2017 | Suzuki | H01M 10/443 |
| 9,653,944 | B2 * | 5/2017 | Teggatz | H02J 3/383 |
| 9,682,673 | B2 * | 6/2017 | Sakata | H02J 7/16 |
| 9,689,753 | B2 * | 6/2017 | Ramey | G01N 33/66 |
| 9,755,440 | B2 * | 9/2017 | Ishibashi | H02J 7/0018 |
| 9,774,062 | B2 * | 9/2017 | Matsunaga | H01M 10/425 |
| 9,774,186 | B2 * | 9/2017 | Anderson | H02J 1/14 |
| 9,774,685 | B2 * | 9/2017 | Narita | H04L 67/12 |
| 9,778,321 | B2 * | 10/2017 | Umemura | H02J 7/00 |
| 9,780,577 | B2 * | 10/2017 | Suzuki | B60L 7/12 |
| 9,863,817 | B2 * | 1/2018 | Vu | H01M 10/486 |
| 9,956,887 | B2 * | 5/2018 | Duan | B60L 11/1861 |
| 9,966,772 | B2 * | 5/2018 | Uesugi | H02J 7/0026 |
| 10,014,683 | B2 * | 7/2018 | Ellenberger | H05B 33/0842 |
| 10,060,985 | B2 * | 8/2018 | Siekkinen | H02J 7/345 |
| 10,131,235 | B2 * | 11/2018 | Weidinger | B60L 3/04 |
| 10,135,271 | B2 * | 11/2018 | Miller | H02J 7/0031 |
| 10,367,364 | B2 * | 7/2019 | Xu | G06F 1/263 |
| 10,551,443 | B2 * | 2/2020 | Shiraishi | G01R 31/389 |
| 2004/0027093 | A1 * | 2/2004 | Tashiro | H02J 7/0091 320/134 |
| 2004/0162698 | A1 * | 8/2004 | Iwaizono | H02J 7/0029 702/132 |
| 2004/0167741 | A1 * | 8/2004 | Iwaizono | H02J 7/0029 702/132 |
| 2005/0225296 | A1 * | 10/2005 | Tashiro | H02J 7/0029 320/134 |
| 2005/0225297 | A1 * | 10/2005 | Tashiro | H02J 7/00043 320/134 |
| 2005/0225298 | A1 * | 10/2005 | Tashiro | H02J 7/00043 320/134 |
| 2008/0152993 | A1 * | 6/2008 | Seiler | H01M 2/1022 429/92 |
| 2008/0212249 | A1 * | 9/2008 | Grewe | H02J 7/0029 361/103 |
| 2009/0058370 | A1 * | 3/2009 | Odaohhara | H01M 10/441 320/152 |
| 2009/0085527 | A1 * | 4/2009 | Odaohhara | H02J 7/0091 320/150 |
| 2009/0121685 | A1 * | 5/2009 | Eto | H01M 10/443 320/152 |
| 2009/0195215 | A1 * | 8/2009 | Sato | H01M 10/443 320/150 |
| 2010/0007310 | A1 * | 1/2010 | Kawamoto | H01M 10/425 320/134 |
| 2010/0096922 | A1 | 4/2010 | Kishimoto | |
| 2010/0176768 | A1 * | 7/2010 | Kimura | H01M 10/443 320/152 |
| 2010/0277128 | A1 * | 11/2010 | Tam | G06F 1/203 320/150 |
| 2011/0052944 | A1 * | 3/2011 | Matthias | H01M 10/44 429/50 |

(56) References Cited

U.S. PATENT DOCUMENTS

| | | | | |
|---|---|---|---|---|
| 2011/0279079 A1* | 11/2011 | Do Valle | ............... | H02J 7/0073 320/107 |
| 2011/0283132 A1* | 11/2011 | Song | ................... | H01M 10/443 713/340 |
| 2012/0146588 A1* | 6/2012 | Ishibashi | ............... | H02J 7/0018 320/138 |
| 2012/0181992 A1* | 7/2012 | Brun-Buisson | ....... | H01M 10/30 320/153 |
| 2012/0212179 A1* | 8/2012 | Nathan | .............. | H01R 13/6683 320/109 |
| 2012/0212184 A1* | 8/2012 | Klein | .................. | H02J 7/00718 320/134 |
| 2012/0272078 A1* | 10/2012 | Anderson | ............. | H02J 7/0091 713/320 |
| 2012/0293021 A1* | 11/2012 | Teggatz | .................. | H02J 3/383 307/151 |
| 2013/0021003 A1 | 1/2013 | Okamoto | | |
| 2013/0063098 A1* | 3/2013 | Knowlton | ............. | H02J 7/0091 320/137 |
| 2013/0127423 A1* | 5/2013 | Liang | .................. | H01M 10/443 320/136 |
| 2013/0169235 A1* | 7/2013 | Patino | ................. | H01M 10/482 320/136 |
| 2013/0221907 A1* | 8/2013 | Suzuki | ................ | H01M 10/443 320/107 |
| 2013/0335024 A1* | 12/2013 | Akai | ...................... | H01M 10/44 320/109 |
| 2014/0028267 A1* | 1/2014 | Lee | ........................ | H02J 7/0091 320/152 |
| 2014/0084873 A1* | 3/2014 | Sim | ........................ | H01M 10/44 320/134 |
| 2014/0266038 A1* | 9/2014 | Gibeau | ............... | B60L 11/1875 320/109 |
| 2014/0277869 A1* | 9/2014 | King | ................... | B60H 1/00278 701/22 |
| 2015/0035356 A1* | 2/2015 | Sakata | ....................... | H02J 7/16 307/9.1 |
| 2015/0054462 A1* | 2/2015 | Weidinger | ................. | B60L 3/04 320/109 |
| 2015/0069975 A1* | 3/2015 | Farah | .................... | H02J 7/0019 320/150 |
| 2015/0084600 A1* | 3/2015 | Sengupta | ............ | H01M 10/443 320/132 |
| 2015/0137737 A1* | 5/2015 | Tanabe | .................. | H01M 10/36 320/107 |
| 2015/0140378 A1* | 5/2015 | Tanabe | .................. | H01M 2/025 429/90 |
| 2015/0153416 A1* | 6/2015 | Umemura | ............. | H01M 10/48 320/107 |
| 2015/0180246 A1* | 6/2015 | Roth | ..................... | H02J 7/0027 320/115 |
| 2015/0203059 A1* | 7/2015 | Narita | ..................... | H04L 67/12 307/9.1 |
| 2015/0240459 A1 | 8/2015 | Kawasaki et al. | | |
| 2015/0277461 A1* | 10/2015 | Anderson | ................. | H02J 1/14 307/32 |
| 2015/0338288 A1* | 11/2015 | Ramey | ..................... | F04B 51/00 374/142 |
| 2015/0340884 A1* | 11/2015 | Suzuki | ..................... | B60L 7/12 320/107 |
| 2015/0372512 A1* | 12/2015 | Umemura | ............. | H02J 7/0021 320/112 |
| 2016/0013521 A1* | 1/2016 | Matsunaga | ......... | H01M 10/441 320/134 |
| 2016/0079777 A1* | 3/2016 | Bhardwaj | ............... | H02J 7/007 320/107 |
| 2016/0134191 A1* | 5/2016 | Teggatz | .................. | H02J 3/383 323/271 |
| 2016/0294021 A1* | 10/2016 | Ueno | ................... | H01M 10/443 |
| 2016/0359204 A1* | 12/2016 | Bu | ......................... | H01M 10/48 |
| 2016/0359345 A1* | 12/2016 | Uesugi | .................. | H02J 7/0026 |
| 2017/0214256 A1* | 7/2017 | Hardy | ..................... | B60L 58/22 |
| 2017/0302102 A1* | 10/2017 | Teggatz | ................. | H02J 3/383 |
| 2017/0321853 A1* | 11/2017 | Chien | ................... | H02J 7/0027 |
| 2018/0145520 A1* | 5/2018 | Sasaki | ................... | H01M 10/48 |
| 2018/0186244 A1* | 7/2018 | Harvey | ................. | B60L 53/305 |
| 2018/0262017 A1* | 9/2018 | Hsu | ......................... | G01K 13/00 |
| 2019/0319466 A1* | 10/2019 | Pk | ............................ | H02H 7/18 |
| 2019/0386350 A1* | 12/2019 | Sato | ......................... | B60L 3/00 |

FOREIGN PATENT DOCUMENTS

| | | |
|---|---|---|
| JP | H07-222370 A | 8/1995 |
| JP | 2003-263252 A | 9/2003 |
| JP | 2004-282857 A | 10/2004 |
| JP | 2008-159590 A | 7/2008 |
| JP | 2011-139572 A | 7/2011 |
| JP | 2012-125056 A | 6/2012 |
| JP | 2012-227983 A | 11/2012 |
| JP | 2015-134591 A | 7/2015 |
| JP | 2015-186338 A | 10/2015 |
| WO | 2013/141196 A1 | 9/2013 |
| WO | 2017/087414 A1 | 5/2017 |

OTHER PUBLICATIONS

International Search Report and Written Opinion for PCT application No. PCT/US2016/062084, dated Feb. 23, 2017, 11 pages.

International Preliminary Report on Patentability for PCT application No. PCT/US2016/062084, dated May 31, 2018, 10 pages.

Extended European Search Report and Opinion for EP application No. 16866966.1, dated Aug. 20, 2019, 8 pages.

* cited by examiner

| Auto Charging Scenario (algorithm) | Port 1 | Port 2 | Port 3 | Thermal Condition |
|---|---|---|---|---|
| Standard | 15W | 15W | 15W | Nominal |
| Limit 1 | 15W | 12W | 12W | Medium |
| Limit 2 | 15W | 7.5W | 7.5W | High |
| Limit ... | | | | |
| Limit N | 0W | 0W | 0W | Over Limit |

FIG 2

POWER CHARGING MODULE AND TEMPERATURE-BASED METHODS OF USING SAME

RELATED APPLICATIONS

This patent application claims the benefit of U.S. provisional patent application Ser. No. 62/255,841, filed Nov. 16, 2015, which is incorporated herein by reference.

TECHNICAL FIELD

This disclosure relates to the field of power charging modules, and more specifically to the field of power charging modules with modifiable power delivery and methods of using same.

DESCRIPTION OF RELATED ART

With the evolution of mobile technology, vehicle manufacturers recognize customers' desires to be able to charge their mobile devices (e.g., mobile phones, tablets, computers, GPS units, headphones/headsets, etc.) while in their vehicle, regardless of whether the customer is actually using the mobile device. As a part of this, vehicle manufacturers are requesting higher power charging modules, as well as requesting these higher power charging modules in tighter form factors. These requests are pushing the limits of the power charging modules to dissipate the heat generated from the power dissipated due to circuit inefficiencies. To further compound the issue, vehicle manufacturers are further requesting that the higher power charging modules be provided with multiple high power charging ports. The heat generated from this power dissipation can damage the sensitive electronics and even cause damage to the mechanical assemblies. Furthermore, the heat generated from this power dissipation could possibly be a safety concern due to fire.

Presently, to protect against these problems, most power charging modules are provided with a protection circuit that shuts the device down when a temperature above a predetermined high temperature is detected. When this shut down occurs, users are left without charging capabilities until the detected temperature is lowered to below the predetermined high temperature.

It would be desirable to provide a vehicle power charging module, and methods of using same, which overcomes the disadvantages of the prior art vehicle power charging modules. More specifically, it would be desirable to provide a device and method for automatically detecting real-time thermal conditions and adjusting the power delivered from the device to regulate the temperature in real time. The benefit of this would be that the device could continue to charge one or more of the user's mobile devices at a reduced power level instead of allowing the temperature to rise to a critical level before completely disabling itself, which leaves the user with no charging capabilities whatsoever.

SUMMARY

A power charging module and methods of using same, are provided. In one aspect, a power charging module includes a controller, a charging port, and a temperature sensor. The controller is programmed to define at least three thermal condition ranges. The at least three thermal condition ranges include a nominal thermal condition range, a critical thermal condition range, and an intermediate thermal condition range. The intermediate thermal condition range is between the nominal thermal condition range and the critical thermal condition range. The charging port is associated with the controller and is configured to deliver power to an external device plugged into the charging port. The temperature sensor is configured to sense a temperature and to provide the sensed temperature to the controller. The controller is configured to determine in which thermal condition range the sensed temperature is categorized. The controller is configured to deliver a standard maximum power output to the charging port if the sensed temperature is categorized in the nominal thermal condition range, deliver a modified maximum power output to the charging port if the sensed temperature is categorized in the intermediate thermal condition range, and discontinue power output to the charging port if the sensed temperature is categorized in the critical thermal condition range.

In another aspect, a method of charging devices includes the steps of: providing a power charging module, with the power charging module having a charging port and at least one temperature sensor. The method includes defining a plurality of thermal condition ranges, wherein the plurality of thermal condition ranges include a nominal thermal condition range, a critical thermal condition range, and an intermediate thermal condition range, and the intermediate thermal condition range is between the nominal thermal condition range and the critical thermal condition range. The method includes sensing a temperature at the temperature sensor and determining a corresponding thermal condition range for the sensed temperature. The method includes delivering a standard maximum power output to the charging port if the sensed temperature is within the nominal thermal condition range, delivering a modified maximum power output to the charging port if the sensed temperature is within the intermediate thermal condition range, and discontinuing power output to the charging port if the sensed temperature is within the critical thermal condition range.

In still another aspect, a power charging system includes a charging port, a temperature sensor, and a controller. The charging port is configured to deliver power to a device operatively connected to the charging port. The temperature sensor is operative to generate temperature signals indicative of a sensed temperature. The controller is configured to store a plurality of thermal condition ranges, with the plurality of thermal condition ranges including a nominal thermal condition range, at least one intermediate thermal condition range, and a critical thermal condition range. The at least one intermediate thermal condition range is between the nominal thermal condition range and the critical thermal condition range. The controller is further configured to store a standard maximum power output setting for each of the charging ports and a modified maximum power output setting for each of the charging ports and determine the sensed temperature at the temperature sensor based upon the temperature signals. Upon the sensed temperature being within the nominal thermal condition range, the controller is configured to deliver power to the charging port based upon the standard maximum power output setting. Upon the sensed temperature being within the intermediate thermal condition range, the controller is configured to deliver power to the charging port based upon the modified maximum power output setting. Upon the sensed temperature being within the critical thermal condition range, the controller is configured to discontinue power output to the charging port.

BRIEF DESCRIPTION OF THE DRAWINGS

The present invention is illustrated by way of example and not limited in the accompanying figures in which like reference numerals indicate similar elements and in which:

FIG. 2 illustrates a table illustrating potential automatic charging scenarios (algorithms) with different thermal conditions.

DETAILED DESCRIPTION

The detailed description that follows describes exemplary embodiments and is not intended to be limited to the expressly disclosed combination(s). Therefore, unless otherwise noted, features disclosed herein may be combined together to form additional combinations that were not otherwise shown for purposes of brevity.

Figure 1:
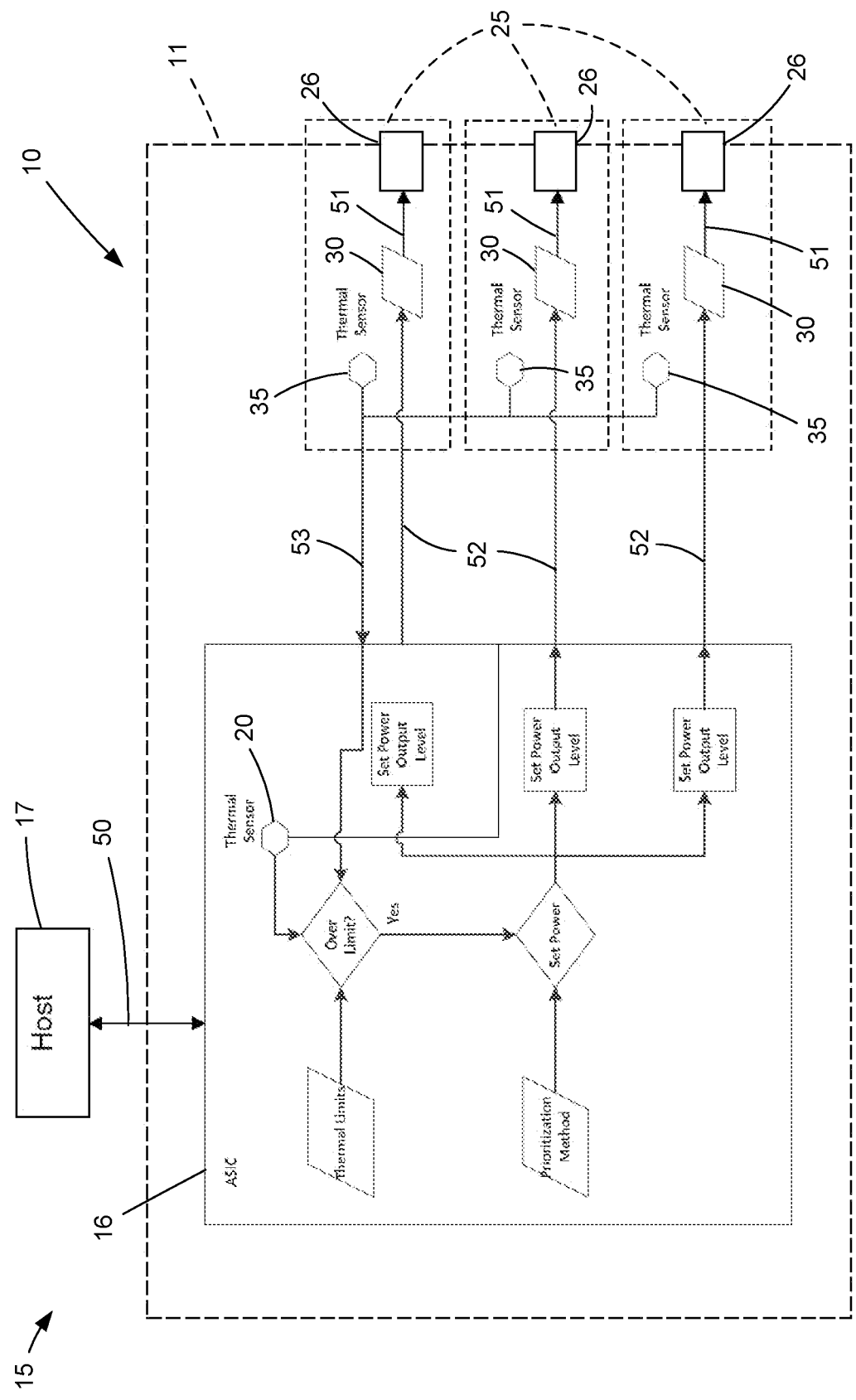
FIG. 1 illustrates a functional block diagram of a first exemplary embodiment of a power charging module as described herein.

A functional block diagram of a first exemplary embodiment of a vehicle power charging module or system 10 is illustrated in FIG. 1.

In the first exemplary embodiment, the vehicle power charging module or system 10 is depicted to include a controller 15, one or more first temperature sensors 20, and a plurality of charging port assemblies 25. All or some of the components of the power charging module 10 may be disposed or located within a housing depicted by a dashed line generally indicated at 11.

The power charging module 10 may be associated with and controlled by any type of controller 15 that is acceptable for its intended application, as will be readily understood by one skilled in the art. The controller 15 can be an electronic controller that operates in a logical fashion to perform operations, execute control algorithms, store and retrieve data and other desired operations. The controller 15 can include or access memory, secondary storage devices, processors, and any other components for running an application. The memory and secondary storage devices can be in the form of read-only memory (ROM), random access memory (RAM) or integrated circuitry that is accessible by the controller. Various other circuits can be associated with the controller such as power supply circuitry, signal conditioning circuitry, driver circuitry, and other types of circuitry.

The controller 15 may be a single controller or may include more than one controller disposed to control various functions and/or features. The term "controller" is meant to be used in its broadest sense to include one or more controllers, state machines, and/or microprocessors that may be associated with the power charging module and that may cooperate in controlling various functions and operations related to or associated with the power control module. The functionality of the controller 15 can be implemented in hardware and/or software without regard to the functionality. The controller 15 may rely on one or more data maps relating to the operating conditions and the operating environment of the power control module that may be stored in the memory. Each of these data maps may include a collection of data in the form of tables, graphs, and/or equations. Such data maps may be updated from time to time in any desired manner. As depicted, the controller 15 includes an application-specific integrated circuit (ASIC) 16.

The ASIC 16 is connected to a power source (not shown), such as a battery or the like, in a vehicle such that the power source delivers power to the ASIC 16. The controller 15 may also include an auto infotainment head end unit, another electronic control, or host 17 operatively connected to the ASIC 16 via connection 50.

One or more first temperature sensors 20 are operatively connected to the controller 15. In one embodiment, a first temperature sensor 20 can be integrated into the controller 15 such as the ASIC 16. In the alternative or in addition, first temperature sensors 20 may be separate from but adjacent and operatively connected to the ASIC 16. If more than one first temperature sensor 20 is connected to the ASIC 16, the first temperature sensors 20 are preferably provided at different locations.

Each charging port assembly 25 may include a charging port or receptacle 26 with a charging source 30 electrically connected thereto via connection 51 to provide power to the port. The charging port 26 and charging source 30 are operatively connected to the controller 15 via connection 52. The charging source 30 may have any desired configuration and in one embodiment is a buck regulator or converter. The controller 15 is configured to control the manner in which power is delivered from the charging source 30 to the charging port 26. In some embodiments, each charging port assembly 25 may include an integrated circuit or microprocessor adjacent the power source 30 that is operatively connected to the ASIC 16 so that the ASIC 16 can provide instructions to the integrated circuit or microprocessor of the charging port assembly 25.

The charging ports 26 are located in physically accessible locations of a vehicle and may each be located in a common area, e.g., the dashboard or console, or each may be located in different areas, e.g., the dashboard/console, the glove compartment, a middle compartment, the trunk, etc. Thus, the charging ports 26 may be located proximate to the ASIC 16 or may be located distal from the ASIC 16. In other words, although depicted within housing 11, the charging ports 26 may be located remotely from the ASIC 16 and not within a single housing 11, if desired. Regardless of whether the charging port assemblies 25 are adjacent or remote form the ASIC 16 or within a single housing, the power charging module 10 includes such charging port assemblies 25.

The charging ports 26 are configured to charge mobile devices, e.g., mobile phones, tablets, computers, GPS units, headphones/headsets, etc. The charging ports 26 may have any configuration and, in some embodiments, may be USB ports. Each charging port 26 may have the same configuration or they may have different configurations.

One or more second temperature sensors 35 are operatively connected to, or positioned proximate to, each of the charging port assemblies 25. Each second temperature sensor 35 is also connected to the controller 15 via connection 53. If each charging port assembly 25 has more than one second temperature sensor 35 associated with it, the second temperature sensors 35 are preferably provided at different locations.

Each of the first and second temperature sensors 20, 35 may be of any type or configuration. In some embodiments, the first and/or second temperature sensors 20, 35 may be temperature sensors used with an i2C buss or a PTC thermistor. In other embodiments, the temperature sensors 20, 35 may be diodes integrated into integrated circuits such as ASIC 16. Each temperature sensor 20, 35 may be programmed to continually monitor a temperature at their respective locations and to communicate the sensed temperatures to the controller 15.

The controller 15 may be configured to dynamically control the charging port assemblies 25 so that they provide power to the charging ports 26 based upon the temperature at which the vehicle power charging module 10 is operating and according to desired power delivery strategies. For example, the controller 15 may be configured or programmed to define various thermal condition ranges. The various thermal condition ranges can be, for example, hardwired or set via firmware or preloaded memory.

In the present example, and with specific reference to FIG. 2, the controller 15 is programmed with four (4) thermal condition ranges, namely a nominal thermal condition range, a critical or over limit thermal condition range, and first (or medium) and second (or high) intermediate thermal condition ranges. In the present example, the nominal thermal condition range is defined as temperatures at or below 85° Celsius (185° Fahrenheit). The first intermediate thermal condition range is defined as temperatures above 85° Celsius (185° Fahrenheit) and at or below 90° Celsius (194° Fahrenheit). The second intermediate thermal condition range is defined as temperatures above 90° Celsius (194° Fahrenheit) and below 100° Celsius (212° Fahrenheit). The critical thermal condition range is defined as temperatures at or above 100° Celsius (212° Fahrenheit).

As a result of the four thermal condition ranges, three temperature thresholds are defined. More specifically, the medium intermediate thermal condition range has a temperature threshold of 85° Celsius, the high intermediate thermal condition range has a temperature threshold of 90° Celsius, and the critical thermal condition range has a temperature threshold of 100° Celsius.

The controller 15 is configured to receive the communicated sensed temperatures from the first and second temperature sensors 20, 35 and to compare or categorize the sensed temperatures received with respect to the thermal condition ranges. Furthermore, the controller 15 may be configured to deliver an amount of power to each charging port 26 depending on the applicable thermal condition range(s) identified. The charging configuration or strategy specifying the amount of power delivered to each charging port 26 may be set in any desired manner. For example, in the exemplary embodiment, and as noted in FIG. 2, when all of the sensed temperatures received are categorized in the nominal thermal condition range, each of the charging ports 26 is configured to deliver a standard maximum power output of 15 watts (15 W). With each charging port 26 delivering the standard maximum power output, the mobile devices connected to the charging ports 26 may be charged at the standard and optimal level. If, however, one of the sensed temperatures does not fall into the nominal thermal condition range, then the controller 15 operates to change the amount of power delivered to one or more of the charging ports 26.

When any one of the sensed temperatures received from the first or second temperature sensors 20, 35 falls within or is categorized in the first intermediate thermal condition range, the controller 15 may operate according to an intermediate charging configuration to reduce the power delivery and/or consumption in an attempt to reduce the temperatures within the power charging module 10 to within the nominal thermal condition range, or at least maintain the temperature or temperatures associated with the power charging module 10. As depicted in FIG. 2, to do so, the controller 15 is configured to maintain the standard maximum power output of 15 watts (15 W) of the first charging port, but will provide a first modified maximum power output of 12 watts (12 W) for each of the second and third charging ports. Thus, while each of the charging ports 26 will continue to charge the respective mobile devices connected to them, only the first charging port will continue to charge at the standard and optimal level.

When any one of the sensed temperatures received from the first or second temperature sensors 20, 35 is categorized in the second intermediate thermal condition range, the controller 15 may operate according to a high charging configuration to further reduce the power delivery and/or consumption in an attempt to further reduce the temperatures to within the nominal thermal condition range or the first intermediate thermal condition range, or at least maintain the temperature or temperatures associated with the power charging module 10. As depicted in FIG. 2, to do so, the controller 15 is configured to maintain the standard maximum power output of 15 watts (15 W) of the first charging port, but will provide a second modified maximum power output of 7.5 watts (7.5 W) for each of the second and third charging ports. Thus, while each of the charging ports 26 will continue to charge the respective mobile devices connected to them, only the first charging port will continue to charge at the standard and optimal level.

When any one of the sensed temperatures received from the first or second temperature sensors 20, 35 is categorized in the critical thermal condition range, the controller 15 operates to further reduce the power delivery and/or consumption to further reduce the temperatures to within the nominal thermal condition range, the first intermediate thermal condition range, or the second intermediate thermal condition range. As depicted in FIG. 2, to do so, the controller 15 is configured to discontinue power output to each of the charging ports 26. Thus, none of the charging ports 26 will charge the respective devices connected to them.

The different configurations or scenarios (algorithms), as identified, for example, in FIG. 2, preferably prioritize power output to maximize the power provided to each charging port 26 while maintaining a thermal limit that is not destructive to any of the mobile devices, the power charging module 10, or other portions of the vehicle. Like the thermal condition ranges, the different scenarios can be programmed into the controller 15 by any appropriate means.

Under typical operating conditions, it is desirable for the power charging module 10 to operate in the nominal thermal condition range. It is contemplated that some type of hysteresis would be used in connection with the sensed temperatures before the controller 15 changes the power output back to a higher level. For example, in the embodiment described above, if any one of the sensed temperatures is categorized in the second intermediate thermal condition range, the controller 15 will maintain the standard maximum power output of 15 watts (15 W) to the first charging port, but will provide a second modified maximum power output of 7.5 watts (7.5 W) to each of the second and third charging ports. However, it may not be desirable to change the second modified maximum power output from 7.5 watts (7.5 W) to 12 watts (12 W) or 15 watts (15 W) as soon as all of the sensed temperatures are no longer in the second intermediate thermal condition range. Instead, it may be desirable for the controller 15 to maintain the reduced maximum power output (e.g., 7.5 watts) for a predetermined period of time or until all sensed temperatures are provided in the nominal thermal condition range (thus essentially disregarding the action to be taken when the sensed temperatures are in the first intermediate thermal condition range).

The prioritization of the power to the charging ports 26 may be organized or performed in any desired manner. In the embodiment depicted in FIG. 2, except in the instance where the sensed temperatures are categorized in the critical thermal condition range, the first charging port is always maintained at the standard and ideal maximum power output, whereas the second and third charging ports may be provided with the modified maximum power output. In some instances, the identity or location of the first, second, and third charging ports may be fixed and, in another instances, the identity or location of the charging ports may change.

In one embodiment, the controller 15 may be configured to recognize or define the first charging port as the charging port 26 which first has a mobile device connected to it. In a second embodiment, the controller 15 may be configured so that the first charging port is always the same charging port, for instance the charging port located closest to the driver of the vehicle and regardless of whether a different charging port first had a mobile device connected to it. In a third embodiment, the controller 15 may be configured so that the first charging port is always the same charging port, unless a mobile device is not connected to the designated first charging port in which case the controller would designate or define the first charging port as the charging port 26 which first has a mobile device connected to it.

The maximum power provided to each charging port 26 may be controlled or changed during the charging process in any desired manner upon a change in the temperature range in which the charging power module 10 is operating. In doing so, the power charging module 10 may operate in any manner to control or limit the power delivered through one or more charging ports 26. In some systems, circuitry within or associated with the power charging module 10 may limit the amount of power provided to each charging port 26. In other systems, the maximum power may be controlled by communications or signals between the controller 15 and the device to be charged. Still other manners of changing or limiting the maximum power provided to a charging port 26 or drawn by the device being charged are contemplated.

In one embodiment, the controller 15 may advertise or communicate to the connected device the amount of current that may be drawn from the charging port 26. More specifically, the controller 15 may advertise or communicate via the electrically conductive terminals or pins (not shown) of the charging port 26 and through an electrical cable assembly (not shown) that electrically connects the charging port 26 to the device being charged. For example, when a charging port 26 is configured as a USB Type C port, the power charging module 10 (or the host or head unit 17) may communicate to the device being charged through configuration channel or "cc" pins of the port. In doing so, the controller 15 may advertise or communicate whether the port 26 is operating in a low current mode (i.e., 500 or 900 mA), a medium current mode (i.e., 1.5 A), or a high current mode (i.e., 3.0 A). The device may determine the mode in which the USB Type C port is operating based upon the resistance or current at the cc pins. In order to reduce the amount of current being drawn, the controller 15 may advertise or communicate a desired change in operation by changing the resistance or current at the cc pins with the new resistance or current at the cc pins corresponding to the desired power or current.

In another embodiment, a charging port 26 may be configured as a "charging downstream port" and used with a USB system (other than Type C) that is capable of both charging and sending data simultaneously. In such case, the head end unit 17 operatively connected to the power charging module 10 may generate signals that are communicated to the device being charged to specify the charging mode for the device. More specifically, the host 17 may send appropriate signals that specify the charging mode via the electrically conductive terminals or pins (not shown) of the charging port 26 and through an electrical cable assembly (not shown) to the electrically connected device being charged. Upon determining that a change in the maximum power to be delivered through a charging port 26 is desired, the host 17 may send appropriate signal so that the device being charged draws less current. More specifically, upon the power charging module 10 determining that a change in maximum power is required, the power charging module 10 may communicate such required change to the host 17. The host 17 may generate appropriate signals sent through the power charging module 10 including the charging ports 26 to the devices being charged. In doing so, the host 17 may generate disconnect signals to disconnect the device and re-enumeration signals to reconnect the device. During such re-enumeration, the host 17 will provide signals to reconfigure the connection including the desired new maximum current to be drawn by each device being charged. As an example, when a charging port 26 is configured with an APPLE LIGHTNING® connector, the host 17 may specify the charging mode and thus the maximum current (e.g., 1.5 or 2.4 A) to be drawn by the device being charged.

In still another embodiment, a charging port 26 may be configured as a "dedicated downstream port" that is capable of only charging a device plugged into the port 26. In such case, upon connecting a device to the charging port 26, the controller may determine the desired charging characteristics of the device. In one example, the host 17 is remote from the ASIC 16 and may determine the desired charging characteristics of the device. Upon determining that a change in the current to be drawn by the device being charged is desired or required, rather than physically disconnecting the device from the charging port 26, a portion of the controller 15 may simulate a disconnection by temporarily reducing the voltage at the $V_{bus}$ pin below a specified voltage (e.g., 5 V). Upon increasing the voltage at the $V_{bus}$ pin back to the desired operating voltage, the controller 15 may advertise or communicate a different charging mode in order to change the current to be drawn by the connected device.

Other manners of changing the amount of current being drawn by the device being charged are contemplated.

If desired, controller 15 may be configured to provide a notice that the power to at least some of the charging ports 26 is being changed (i.e., reduced or increased). In some embodiments, the notice may take the form of information displayed on a screen or panel within the vehicle.

The disclosure is described and illustrated with regard to a power charging module 10 for use in a vehicle. It is to be understood that the term vehicle as used herein is to be broadly interpreted, such that a vehicle may include, but is not limited to, for example, wagons, bicycles, motor vehicles (motorcycles, cars, trucks, buses), railed vehicles (trains, trams), construction vehicles (excavators, tractors), recreational vehicles (snowmobiles, ATVs), watercraft (ships, boats), aircraft and spacecraft. Further, while the disclosure is described and illustrated with regard to a power charging module 10 for use in a vehicle, it is to be understood that the power charging module may be used in any environment, whether associated with a vehicle or not.

While the disclosure is described and illustrated with the power charging module 10 being a standalone device, the power charging module may be part of a larger electronic unit, module, or system.

While the disclosure is described and illustrated with regard to the power charging module 10 utilizing an ASIC 16, it is to be understood than any other appropriate means, such as a microprocessor, state machine, or any discrete electronic solution, could be utilized.

While the disclosure is described and illustrated with regard to having at least one temperature sensor 20 associated with the ASIC 16, and at least one temperature sensor 35 associated with each of the charging port assemblies 25, it is to be understood that only one of these temperature sensors may be provided.

While the disclosure is described and illustrated as having only four thermal condition ranges, it is to be understood that more or less thermal condition ranges could be provided as desired. In other words, although the power control module 10 is described and illustrated with two intermediate thermal condition ranges, the power control module may also utilize one or three or more thermal intermediate thermal condition ranges. Furthermore, while the disclosure is described and illustrated as only having a high temperature critical thermal condition range, it is to be understood that a low temperature critical thermal condition range could be alternatively provided and/or conjunctively provided.

While the disclosure is described and illustrated as having exemplary power outputs, it is to be understood that other power outputs could be provided as desired, and the disclosure should not be limited to the exemplary power outputs. Furthermore, while the disclosure is described and illustrated as having exemplary temperature ranges, it is to be understood that other temperature ranges could be provided as desired, and the disclosure should not be limited to the exemplary temperature ranges.

While the disclosure is described and illustrated as having three charging ports 26, it is to be understood that more or less charging ports could be provided as desired. In other words, the disclosure is applicable to power charging modules 10 having one or more charging ports 26.

While the disclosure is described and illustrated as always having the second and third charging ports having identical modified maximum power outputs, it is to be understood that, if desired, the modified maximum power output of the second charging port could be different than the modified maximum power output of the third charging port. Furthermore, while the disclosure is described and illustrated as always having the first charging port have the standard maximum power output except when a sensed temperature is categorized in the critical thermal condition range, it is to be understood that, if desired, the maximum power output of the first charging port could also be modified in the same way that the maximum power output of the second and third charging ports are modified, or in a different way than the maximum power output of the second and third charging ports are modified. It is to be further understood that in some instances, one or more second temperature sensors 35 may indicate an increase in temperature adjacent a charging port 26. In such case, if desired, the maximum power output of the charging ports 26 adjacent the second temperature sensors 35 indicating an increase temperature may be modified without modifying the maximum power output of the other charging ports 26.

In some embodiments, the power strategies or prioritization of the order in which maximum power supplied by the charging ports 26 is reduced may be set or stored by a manufacturer. In other embodiments, the power strategies or prioritization may also or alternatively be set or stored by an operator of the vehicle in which the power charging module 10 is located.

Figure 3:
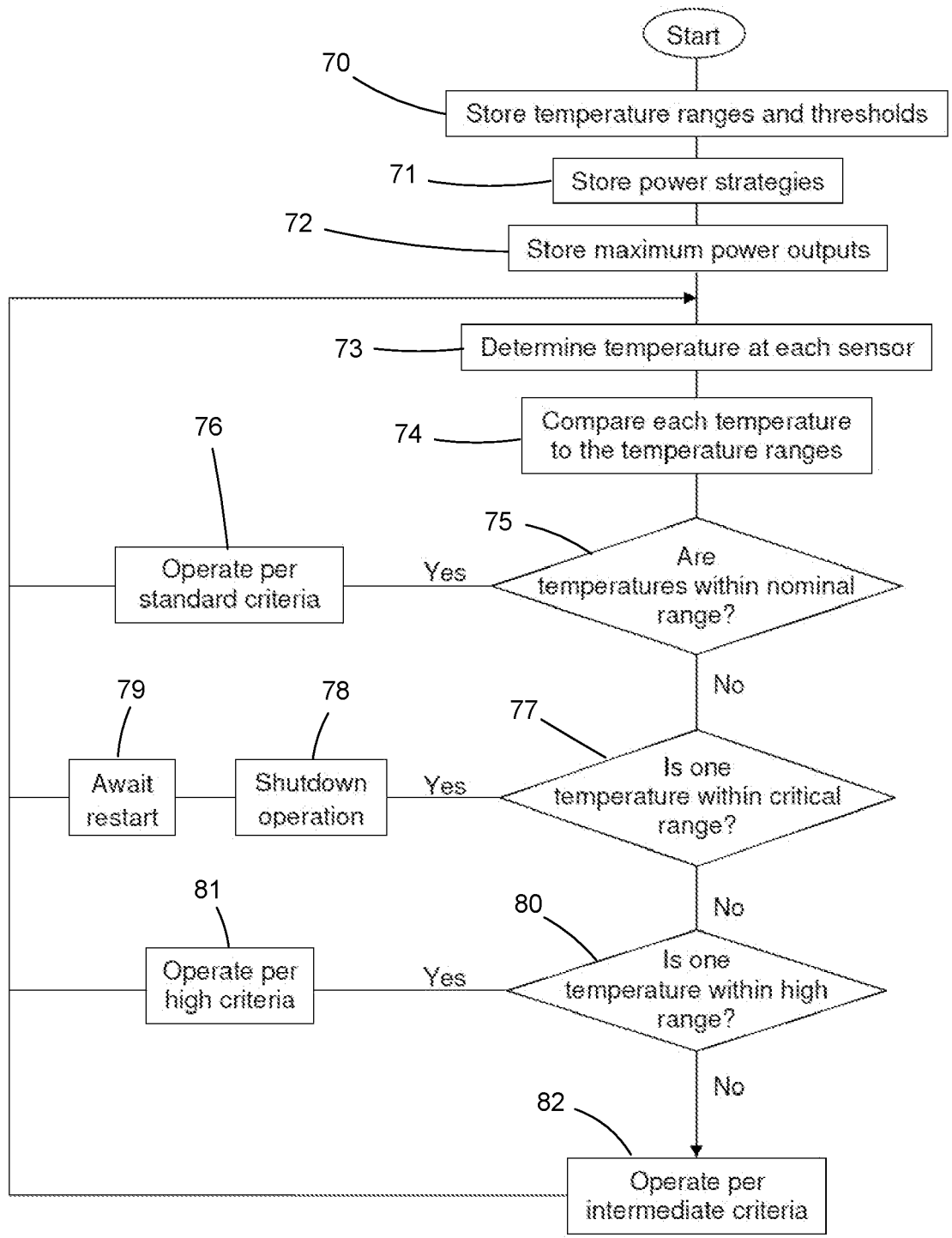
FIG. 3 illustrates a flowchart of a manner of operating the power charging module.

A flowchart depicting one manner of operating the power charging module 10 is depicted in FIG. 3. At stage 70, the temperature or thermal condition ranges and thresholds may be set or stored within controller 15. For example, the nominal thermal condition range, one or more first intermediate thermal condition ranges, and the critical thermal condition range may be set within the controller 15. Setting the different thermal condition ranges will also define the temperature thresholds within the controller 15.

Power strategies including the order in which the maximum power supplied by each charging port 26 is reduced may be set at stage 71. The maximum power output settings that may be supplied by each charging port 26 within each thermal condition range may be set at stage 72. The controller 15 may receive at stage 73 temperature signals from each temperature sensor 20, 35 and determine the temperature at each sensor 20, 35 based upon the temperature signals. At stage 74, the controller 15 may compare the temperatures determined by the controller 15 to the temperature or thermal condition ranges set or stored within the controller 15.

At decision stage 75, the controller 15 may determine whether the temperatures reported by all of the temperature sensors 20, 35 are within the nominal thermal condition range. If the temperatures reported by all of the temperature sensors 20, 35 are within the nominal thermal condition range, the power charging module 10 may operate at stage 76 according to the standard operating criteria including the standard maximum power output at each charging port 26 and based upon the standard operating strategy.

If the temperature reported by any of the temperature sensors 20, 35 is not within the nominal thermal condition range, the controller 15 may determine at decision stage 77 whether at least one reported temperature is within the critical thermal condition range (i.e., exceeds the critical threshold). If any reported temperature is within the critical thermal condition range, the power charging module 10 may shut down operation at stage 78. The power charging module 10 may remain shut down at stage 79 according to restart criteria. In one example, the power charging module 10 may remain shut down for a predetermined period of time until returning to stage 73. In another example, the power charging module 10 may remain shut down until none of the temperatures reported by the temperature sensors 20, 35 are within the critical thermal condition range by returning to stage 73.

If any reported temperature is not within the critical thermal condition range, the power charging module 10 may determine at decision stage 80 whether at least one reported temperature is within the high thermal condition range (i.e., exceeds the high threshold but is less than the critical threshold). If any reported temperature is within the high thermal condition range, power to all or some of the charging ports 26 may be reduced so that the power charging module 10 is operating at stage 81 according to the high operating criteria including the specified maximum power output at each charging port 26 for the high thermal condition and based upon the operating strategy for the high thermal condition. Reduction of the maximum power output at the specified charging ports 26 may be accomplished in any manner including those specified above. Continued operation of the power charging module 10 may be performed by returning to stage 73.

If any reported temperature is not within the high thermal condition range, power to all or some of the charging ports 26 may be reduced so that the power charging module 10 is operating at stage 82 according to the medium operating criteria including the specified maximum power output at each charging port 26 for the medium thermal condition and based upon the operating strategy for the medium thermal condition. Reduction of the maximum power output at the specified charging ports 26 may be accomplished in any manner including those specified above. Continued operation of the power charging module 10 may be performed by returning to stage 73.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

What is claimed is:

1. A power charging module, the power charging module comprising:
    a controller programmed to define at least three thermal condition ranges, wherein the at least three thermal condition ranges include a nominal thermal condition range, a critical thermal condition range, and an intermediate thermal condition range, the intermediate thermal condition range being between the nominal thermal condition range and the critical thermal condition range;
    a plurality of charging ports including a first charging port, each charging port being associated with the controller and being configured to deliver power to an external device plugged into the charging port; and
    a first temperature sensor, the first temperature sensor configured to sense a temperature and to provide the sensed temperature to the controller,
    wherein the controller is configured to determine in which thermal condition range the sensed temperature is categorized, and wherein the controller is configured to:
        deliver a standard maximum power output to the first charging port if the sensed temperature is categorized in the nominal thermal condition range;
    a second temperature sensor adjacent one of the charging ports, the second temperature sensor being configured to sense a second temperature and to provide the second sensed temperature to the controller, wherein the controller is configured to:
        deliver a standard maximum power output to each of the charging ports if the sensed temperatures from both the first temperature sensor and the second temperature sensor are categorized in the nominal thermal condition range, and
        deliver the standard maximum power output to the first charging port and a modified maximum power output to at least one of the other charging ports if the sensed temperature from either the first temperature sensor or the second temperature sensor is categorized in the intermediate thermal condition range and the sensed temperature from another of the first temperature sensor or the second temperature sensor is categorized in the nominal thermal condition range, and
        discontinue power output to at least one of the charging ports if the sensed temperature from either the first temperature sensor or the second temperature sensor is categorized in the critical thermal condition range.

2. A method of charging devices, the method comprising the steps of
    providing a power charging module, the power charging module having a plurality of charging ports configured to deliver power to external devices, the plurality of charging ports including a first charging port and a first temperature sensor and a second temperature sensor, the second temperature sensor being adjacent one of the charging ports;
    defining a plurality of thermal condition ranges, wherein the plurality of thermal condition ranges include a nominal thermal condition range, a critical thermal condition range, and an intermediate thermal condition range, the intermediate thermal condition range being between the nominal thermal condition range and the critical thermal condition range;
    sensing a temperature at each of the first temperature sensor and the second temperature sensor;
    determining a corresponding thermal condition range for each sensed temperature;
    delivering a standard maximum power output to each of the charging ports if the sensed temperatures from both the first temperature sensor and the second temperature sensor are within in the nominal thermal condition range;
    delivering the standard maximum power output to the first charging port and a modified maximum power output to at least one of the other charging ports if the sensed temperature from either the first temperature sensor or the second temperature sensor is within the intermediate thermal condition range and the sensed temperature from the other of the first temperature sensor or the second temperature sensor is categorized in the nominal thermal condition range; and
    discontinuing power output to at least one of the charging ports if the sensed temperature from either the first temperature sensor or the second temperature sensor is categorized in the critical thermal condition range.

3. The method according to claim 2, wherein the first charging port is defined by a prioritization method.

4. The method according to claim 3, wherein the prioritization method is a first plugged in method.

5. The method according to claim 3, wherein the prioritization method is a defined priority port.

6. A power charging system, the power charging system comprising:
    a plurality of charging ports, each being configured to deliver power to a device operatively connected to the charging port, wherein the device is an external device;
    a temperature sensor operative to generate temperature signals indicative of a sensed temperature; and
    a controller configured to:
        store a plurality of thermal condition ranges, the plurality of thermal condition ranges including a nominal thermal condition range, at least one intermediate thermal condition range, and a critical thermal condition range, the at least one intermediate thermal condition range being between the nominal thermal condition range and the critical thermal condition range;
        store a standard maximum power output setting for the charging ports and a modified maximum power output setting for the charging ports;
        determine the sensed temperature at the temperature sensor based upon the temperature signals;
        upon the sensed temperature being within the critical thermal condition range, discontinue power output to at least one charging port, wherein the temperature sensor is a first temperature sensor for determining a first sensed temperature and further including a second temperature sensor adjacent at least one charging port for generating a second sensed temperature, and the controller is further configured to
            deliver power to each of the charging ports according to the standard maximum power output setting upon both of the first sensed temperature and the second sensed temperature being within the nominal thermal condition range, and deliver power to one of the charging ports according to the standard maximum power output setting and to another of the charging ports according to the modified maximum power output setting upon one of the first sensed temperature and the second sensed temperature being within the nominal thermal condition range and the other of the first sensed temperature and the second sensed temperature being within the intermediate thermal condition range.

7. The system of claim 6, wherein the first temperature sensor is adjacent at least one charging port of the plurality of charging ports.

8. The system of claim 6, wherein the standard maximum power output setting includes a maximum power output to each of the charging ports, the maximum power output for each charging port being at an identical power output, and the modified maximum power output setting includes a first modified maximum power output to a first of the charging ports and a second modified maximum power output to a second of the charging ports, the first modified maximum power output being at a first maximum power output, the second modified maximum power output being at a second maximum power output, the second maximum power output being less than the first maximum power output.

9. The system of claim 6, wherein the controller is further configured to display a change in charging status.

10. The system of claim 6, further including a housing including an ASIC therein, the first temperature sensor being adjacent the housing.

11. The system of claim 10, wherein the first temperature sensor is integrated into the ASIC.

12. The system of claim 6, wherein each device is operative in a first charging configuration at a first power and in a second charging configuration at a second power, the second power being less than the first power, and the controller is configured to control power drawn by the device to the first power when the sensed temperature is in the nominal range and the second power when the sensed temperature is in the intermediate range.

13. The system of claim 12, wherein changing between the first charging configuration and the second charging configuration includes the controller reducing a voltage at the charging port.

14. The system of claim 12, wherein changing between the first charging configuration and the second charging configuration includes the controller generating signals to communicate a change in charging configuration to the device.

15. The system of claim 14, wherein the controller includes a host and the host is configured to generate a signal to communicate the change in charging configuration to the device and wherein the host is configured to generate at least one of disconnect signaling to disconnect the device and re-enumeration signaling to reconnect the device.

* * * * *